United States Patent
Powell (10) Patent No.: US 11,214,216 B2
(45) Date of Patent: Jan. 4, 2022

(54) CHILD SAFETY SEAT FOR ATTACHING TO A MOTOR VEHICLE SEAT

(71) Applicant: CYBEX GmbH, Bayreuth (DE)

(72) Inventor: Iain Powell, Bayreuth (DE)

(73) Assignee: CYBEX GmbH, Beyrkuth (DE)

( * ) Notice: Subject to any disclaimer, the term of this patent is extended or adjusted under 35 U.S.C. 154(b) by 0 days.

(21) Appl. No.: 16/641,943

(22) PCT Filed: Aug. 23, 2018

(86) PCT No.: PCT/EP2018/072798
§ 371 (c)(1),
(2) Date: Feb. 25, 2020

(87) PCT Pub. No.: WO2019/038393
PCT Pub. Date: Feb. 28, 2019

(65) Prior Publication Data
US 2020/0247346 A1 Aug. 6, 2020

(30) Foreign Application Priority Data
Aug. 25, 2017 (DE) ...................... 20 2017 105 118.8

(51) Int. Cl.
*B60R 21/207* (2006.01)
*B60N 2/28* (2006.01)
(Continued)

(52) U.S. Cl.
CPC ........ *B60R 21/2072* (2013.01); *B60N 2/2812* (2013.01); *B60N 2/2884* (2013.01);
(Continued)

(58) Field of Classification Search
CPC .............. B60R 21/013; B60R 21/2072; B60R 22/1951; B60N 2/2812; B60N 2/2884;
(Continued)

(56) References Cited

U.S. PATENT DOCUMENTS 6,062,596 A * 5/2000 Boydston ................ B60R 21/01
280/733
7,148,436 B1 * 12/2006 Lee ...................... H01H 1/0036
200/61.48
(Continued)

FOREIGN PATENT DOCUMENTS

DE 19545263 A1 5/1997
DE 10351918 A1 * 6/2005 ........... B60N 2/2839
(Continued)

OTHER PUBLICATIONS

"International Application No. PCT/EP2018/072798, International Search Report and Written Opinion dated Nov. 12, 2018", (Nov. 12, 2018), 17 pgs.

(Continued)

*Primary Examiner* — Paul N Dickson
*Assistant Examiner* — Scott F. Underwood
(74) *Attorney, Agent, or Firm* — Schwegman Landberg & Woessner, P.A.

(57) ABSTRACT

The invention relates to a child safety seat for attaching to a motor vehicle seat, comprising a seat region, a back portion, an impact shield, the impact shield comprising an integrated airbag and/or an airbag being provided in the seat region, an acceleration-sensing device for sensing an acceleration of the child safety seat, and a control device, which is configured in such a way that the airbag is deployed on the basis of an acceleration sensed by the acceleration-sensing device.

13 Claims, 7 Drawing Sheets

(51) Int. Cl.
  *B60R 21/013* (2006.01)
  *B60R 22/195* (2006.01)
  *B60R 22/20* (2006.01)
  *B60R 22/46* (2006.01)
(52) U.S. Cl.
  CPC ........ *B60R 21/013* (2013.01); *B60R 22/1951* (2013.01); *B60R 22/20* (2013.01); *B60R 22/46* (2013.01); *B60N 2002/2815* (2013.01)
(58) Field of Classification Search
  CPC ................ B60N 2/2839; B60N 2/2887; B60N 2002/2815
  See application file for complete search history.

(56) References Cited

U.S. PATENT DOCUMENTS

| | | | | |
|---|---|---|---|---|
| D845,654 S | * | 4/2019 | Imrich | D6/333 |
| D866,202 S | * | 11/2019 | Pos | D6/333 |
| 2010/0264706 A1 | * | 10/2010 | Vogt | B60N 2/2884 297/250.1 |
| 2015/0115677 A1 | * | 4/2015 | Pos | B60N 2/2839 297/256.15 |
| 2017/0113577 A1 | * | 4/2017 | Pos | B60N 2/2812 |
| 2019/0054841 A1 | * | 2/2019 | Cech | G08B 21/22 |
| 2020/0247346 A1 | * | 8/2020 | Powell | B60N 2/286 |

FOREIGN PATENT DOCUMENTS

| | | | | |
|---|---|---|---|---|
| DE | 10351918 A1 | | 6/2005 | |
| DE | 102004007768 A1 | * | 6/2006 | ............. B60R 21/18 |
| DE | 102012104785 A1 | * | 12/2013 | ........... B60N 2/2839 |
| DE | 102012104785 A1 | | 12/2013 | |
| DE | 102017126235 A1 | * | 5/2019 | ......... B60N 2/42727 |
| EP | 1452386 A1 | * | 9/2004 | ........... B60N 2/2884 |
| EP | 2241476 A1 | | 10/2010 | |
| GB | 2323571 A | * | 9/1998 | ............. B60N 2/286 |
| GB | 2323571 A | | 9/1998 | |
| KR | 101230706 B1 | | 2/2013 | |
| WO | WO-2019038393 A1 | | 2/2019 | |

OTHER PUBLICATIONS

"International Application No. PCT/EP2018/072798, International Preliminary Report on Patentability dated Mar. 5, 2020", (w/ English Translation), 9 pgs.

* cited by examiner

CHILD SAFETY SEAT FOR ATTACHING TO A MOTOR VEHICLE SEAT

PRIORITY CLAIM TO RELATED APPLICATIONS

This application is a U.S. national stage filing under 35 U.S.C. § 371 from International Application No. PCT/EP2018/072798, filed on 23 Aug. 2018, and published as WO2019/038393 on 28 Feb. 2019, which claims the benefit under 35 U.S.C. 119 to German Application No. 20 2017 105 118.8, filed on 25 Aug. 2017, the benefit of priority of each of which is claimed herein, and which applications and publication are hereby incorporated herein by reference in their entirety.

The invention relates to a child safety seat for attaching to a motor vehicle seat according to claim 1.

Child safety seats for attaching to a motor vehicle seat are generally known in the related art. Child safety seats of such child may have an impact shield and/or a built-in belt system. Additionally, child safety seats of such child may also be designed to enable them to be connected to the vehicle's belt system. Child safety seats typically comprise at least one seat shell or seat region and a backrest. A child safety seat of such child may also include a head restraint or a support leg or other components. As a rule, the child safety seat according to the invention may also have these features.

It should also be noted that within the scope of this invention the term "child safety seat" is understood to be the umbrella term for "classic" child safety seats and infant car seats. To this extent (unless otherwise indicated in the specific context) "child safety seat" is to be understood to be a shorthand designation for "child safety seat or infant car seat", and within the scope of this invention features that are intended for a child safety seat can generally also be applied to an infant car seat and vice versa (unless otherwise indicated). The same applies for the term "child", which is also understood to be the generic term for children and babies, and infants as well. Products described as "infant car seats" often comprise (only) a one-piece shell for accommodating the baby or child, and may comprise their own belt system, possibly a head restraint and possibly further components. Instead of a (structurally separate) backrest, "infant car seats" of this child have a back portion, which is connected to a "seat region", in which the child's hindquarters can be accommodated. In contrast to this, child safety seats for larger children have a backrest which is structurally separated from a seat region, and whose tilt angle relative to the seat region can be altered if necessary. The structural separation may be formed for example by a bend or a similar arrangement.

In general, it is known that a child is secured in a child safety seat by the three-point safety belt of the car or by a belt which is provided on the child safety seat itself (for example a five-point harness, a chest strap or the like). In these situations, a belt may pass over a shoulder of the child seating in the seat towards an opposite side of the pelvis. Or two belts may also be provided, each passing over a shoulder.

All of these known systems have one thing in common: in the event that the car is involved in a collision, the child in the seat initially continues moving forwards under the effect of mass inertia and is then arrested abruptly by the belts and/or the impact shield. But the child's head continues moving forwards, possibly resulting in a pitching motion, which can lead to dangerous injuries, in the region of the cervical vertebrae for example. A further problem also arises frequently in that the child plunges down into the seat region ("submarining") and slips out under the impact shield, for example.

Airbag solutions in child safety seats are also generally known in the related art. These are intended to assure corresponding protection for the child in the event of a frontal collision, for example. However, the known solutions are still considered to be in need of improvement.

It should be noted at this point that every one of the features described above with regard to the related art may also be features of the child safety seat according to the invention (each individually or in combination).

It is an object of the invention to suggest a child safety seat for attaching to a motor vehicle in which the child is restrained safely and simply during rapid accelerations (also decelerations, wherein according to linguistic usage in the realm of physics acceleration denotes both an increase and a decrease in speed) particularly in the event of a collision in such a manner that the danger of serious injuries is reduced.

This object is solved in particular with a child safety seat for attaching to a motor vehicle which comprises a seat region, a back portion, an impact shield with integrated airbag and/or an airbag in the seat region (optionally also without impact shield), an acceleration sensing device for sensing an acceleration of the child safety seat, and a control device which is configured in such a way that deployment of the airbag is triggered on the basis of an acceleration sensed by the acceleration sensing device.

A first core aspect consists in that the child safety seat has an acceleration sensing device integrated therein, so that the child safety seat can deploy the airbag autarchically (without information to that effect, from an onboard vehicle electronic system, for example). Safety is consequently improved.

An acceleration sensing device is particularly understood to mean a device which responds in such a way (and/or triggers an output of such kind) when a predetermined acceleration limit value is exceeded that the control device is able to cause a deployment of the airbag. The response or output may (but does not have to) comprise an electrical/electronic signal. Optionally, a response or output may also consist in the acceleration sensing device responding mechanically to a predetermined acceleration limit value being exceeded (a locking mechanism is then released, for example), so that this mechanical response (in the example, the release of the locking mechanism and an optionally accompanying movement of the acceleration sensing device or a part thereof) causes the control device in turn to deploy the airbag. Particularly in a solution of such kind, the acceleration sensing device and the control device may optionally also be designed as a single assembly (or even as a single part). However, the acceleration sensing device and the control device are preferably assigned to two different parts or two different assemblies (which may or may not be connected to each other electrically/electronically via a cable and/or wirelessly). Preferably, a distance between the acceleration sensing device and the control device is at least 10 cm. The control device may be for example arranged at least partly on or close to the airbag (or integrated therein). The acceleration sensing device may be arranged at a greater distance from the airbag (in a seat anchorage, for example). In a specific embodiment, the acceleration sensing device comprises an acceleration sensor which is able to detect the surpassing of at least one predetermined acceleration limit value and forward a corresponding output (in particular to the control device).

The object stated above is also solved with a child safety seat for attaching to a motor vehicle, preferably of the kind described above, comprising a seat region, a back portion and an impact shield with an integrated distance increasing device, in particular with integrated airbag, a first (in particular upper or front) and a second (in particular lower or rear) section, wherein the first section is connected to a main body of the child safety seat, and the second section is connected to the first section, and wherein the second section is arranged in such manner that in the event of an activation of the distance increasing device, in particular the airbag, said section is displaced towards a pelvis of a child sitting in the child safety seat (generally: downwards and/or towards the rear), away from the first section. The child safety seat preferably comprises an acceleration sensing device (particularly of the kind described above) for sensing an acceleration of the child safety seat, and a control device (particularly of the kind described above) which is configured which is configured in such a way that a triggering of the distance increasing device, in particular of the airbag, due to an acceleration detected by the acceleration sensing device is sensed. The first and/or second section in particular may be of dimensionally stable construction. When the airbag is not deployed, the first and/or second section may each make up at least 10%, preferably at least 20% of the total volume of the impact shield. A volume of the first and/or second section(s) may be at least 200 cm$^3$, preferably 500 cm$^3$. The first and/or second section may comprise padding. The first and/or second section may also be pivotable towards each other (wherein a pivoting and/or spreading is caused in particular by triggering of the distance increasing device, in particular the airbag). A volume of the distance increasing device, in particular the airbag, in the activated state may or may not be smaller than a volume of the first and second sections (together) in the non-deployed state. Accordingly, therefore, it is not so important for the airbag to be extremely voluminous, such that it can cushion the child in and of itself, but rather that it functions as a distance increasing device (in particular an airbag), which expands (optionally spreads) the impact shield correspondingly so that its protective function is improved. This does not preclude the possibility that the airbag (as is preferably intended) may also have a damping function.

Thus, according to a second core aspect of the invention an impact shield is suggested whose outer dimensions (enveloping surface) are increased when a predetermined acceleration is exceeded (e.g., in a collision), particularly its height in such a situation. The impact shield (or sections thereof) should shift upwards and/or downwards. A shift upwards protects a child's head which is accelerated forwards in the event of a frontal collision particularly effectively. A shift downwards presses particularly on the child's legs and optionally pelvis, so that the child can be prevented from "submarining" out under the impact shield (also eliminating or reducing a risk of this happening).

In one specific embodiment, when seen from the side the impact shield is roughly U-shaped, wherein the U shape is preferably open forwards (facing away from the backrest) and/or wherein the airbag is arranged inside the U-leg (this applies in particular for the deployed or activated state, possibly also for the non-deployed or non-activated state). Alternatively or additionally, a belt guide may be provided in a U-shape, so that a belt belonging to the seat or a belt of the motor vehicle can be accommodated and guided there. Preferably, the first (upper) section of the impact shield should be secured to the child safety seat and/or retained by the belt fitted in the car to ensure that the second section is displaceable towards the child's legs and pelvis. In specific terms, the belt guide may be implemented on a front side and/or on a lower side of the first (upper) section.

The arrangement of a distance increasing device, in particular an airbag (preferably of the kind described above) in a belt guide or in the vicinity of a belt guide of an impact shield is to be considered an inventive thought in its own right.

The object as stated above is also solved with a child safety seat for attaching to a motor vehicle, particularly of the kind described above, comprising
a seat region,
a back portion,
an impact shield and an impact shield positioning apparatus for positioning the impact shield and/or a belt system with a belt system belt tensioner, wherein the belt system may be tightened by the belt system belt tensioner (or belt tightener), and/or a child safety seat anchor system with a child safety seat anchor positioning apparatus and an acceleration sensing device for sensing an acceleration of the child safety seat and a control device which is configured in such a way that the positioning is effected by means of the impact shield positioning apparatus and/or a tensioning is effected by means of the belt system belt tensioner (or belt tightener), and/or a positioning of the child safety seat anchor relative to the other components of the child safety seat is effected in response to a predetermined acceleration, in particular an acceleration which is sensed by an acceleration sensing device integrated in the child safety seat.

The concept of positioning is particularly understood to refer to an action in which the respective component (e.g., impact shield and/or child safety seat anchor) is moved closer to the other components of the child safety seat (or a main body). With regard to the impact shield, this means in particular that by positioning the impact shield is shifted further towards the child (in use) and towards a child support surface (downwards and to the rear).

A third core idea of the invention (which in particular may be combined with the first and second core aspects or core ideas) consists in positioning and tensioning (tightening) an impact shield and/or a belt system (part of the child safety seat) in such a way that when a predetermined acceleration value is exceeded the safety-critical components (that is to say the impact shield and belt system) hold the child securely in place. For this purpose, an integrated acceleration sensing device (particularly of the type described above) is provided, which triggers a corresponding activation in particular independently of external signals (e.g., from a motor vehicle acceleration sensor).

In a preferred embodiment, the acceleration sensing device comprises an acceleration sensor.

The control device actuates or activates (depending on the context in particular the respective airbag, the distance increasing device and/or the impact shield positioning apparatus and/or the belt system belt tensioner) correspondingly preferably when an acceleration threshold value of at least 2 g, more preferably at least 4 g, yet more preferably at least 6 g is exceeded, wherein the acceleration threshold value is additionally or alternatively less than 25 g, preferably less than 20 g, yet more preferably less than 15 g. The letter g stands for acceleration due to gravity.

In the event of activation, the (respective) airbag may be forces downwards and/or towards the rear, in particular towards the pelvis/hips and/or the legs of a child sitting in the child safety seat. Alternatively (or additionally), however, the respective airbag may also be forced upwards and/or to the rear (for example if it is arranged in an upper section of an impact shield or in a seat region). If the airbag is forced either downwards or downwards and to the rear (sloping rearwards), this may serve particularly effectively to prevent the child from slipping out under the impact shield (also reducing a risk of this happening).

The acceleration sensing device, and in particular its acceleration sensor, may be arranged on a section of the child safety seat which is located close to vehicle or the vehicle body when child safety seat is installed. It is particularly preferred if it is arranged in or on an anchoring device, particularly for anchoring the child safety seat to the vehicle or the vehicle body (e.g., IsoFix attachment) or for anchoring a seat element to a child safety seat base.

If the acceleration sensing device, particularly its acceleration sensor, is arranged close to the vehicle or the vehicle body, an anomalous acceleration (or deceleration) such as occurs for example in a frontal collision may be detected particularly early. Safety is improved thereby.

If at least a part of the airbag's action is directed rearwards (for example obliquely to rear), the child is held in place not only by friction and squeezing forces (such as would happen for example if the airbag only acts downwards from the impact shield or upwards from the seat surface), but is also actively pressed backwards (in the event of an acceleration forwards).

The airbag may contain a corresponding (expandable) gas, for example a compressed gas.

The control device and the acceleration sensing device, particularly its acceleration sensor, may be connected to each other by cable or wirelessly. A cable connection is preferred.

The impact shield may be held in place on a/on the main body of the child safety seat by means of the vehicle belt system or by an additional (particular integrated in the child safety seat) retaining device, for example by means of a/the tether strap, wherein optionally a cable may be provided in an additional retaining device for transmitting information, preferably from the acceleration sensing device, in particular the acceleration sensor, to the control device.

The child safety seat may have an (autarchic) power supply, in particular for the acceleration sensing device (the acceleration sensor thereof) and/or control device. This autarchic power supply may be a battery for example (e.g., a 9-Volt battery) and/or a rechargeable battery.

The child safety seat may further comprise a Force limiter for limiting a force which is exerted on the child by a restraining device, in particular a belt system. A Threshold value of the force limiters is preferably above a/the threshold value of a/the positioning device, in particular a/the belt system belt tensioner. This serves to improve safety, since this prevents the force limiter from taking effect too soon (relative to the activation of the effect of the positioning device). Insofar as the application of the force limiter's effect and that of the positioning device are dependent on the acceleration threshold value, the threshold value for the force limiter in particular may be at least 0.5 g, preferably at least 1 g, yet more preferably at least 2 g greater than the threshold value for the positioning device or the belt system belt tensioner. Alternatively or additionally, the force limiter may be blocked until the positioning apparatus and/or the belt system belt tensioner has been triggered.

The abovementioned (respective) positioning device or the abovementioned (respective) belt tensioner (belt tightener) may cooperate with a control device which may be provided additionally with respect to the control device for the distance increasing device or the airbag or may be at least partly embodied thereby. Additionally, the abovementioned (respective) positioning device or the abovementioned (respective) belt tensioner (belt tightener) may cooperate with an acceleration sensing device, in an acceleration sensor, which may be provided additionally with respect to the control device for the distance increasing device or the airbag or may be at least partly embodied thereby.

The belt tensioner may be configured in such a way that it exerts a tensile force on one or two lap belt(s).

(The) lap belts may be lower sections of combined lap-shoulder belts, of they may be structurally separated from the shoulder straps (e.g., by an optionally rigid coupling element, which may optionally have a tongue).

The control device and/or the acceleration sensing device or the acceleration sensor may be integrated in the belt tensioner or they may be provided separately.

Particularly the child's legs and pelvis may be held down by the belt tensioner.

Optionally, it may not be possible to pull (directly) on the lap belts, but instead on an adjustable strap, optionally so that (particularly) shoulder straps are (further) tightened indirectly. The adjustable strap is preferably an extension of the (particularly already joined) shoulder straps and optionally connected therewith via a coupling element (e.g., with at least three or exactly three slots).

In certain embodiments, a corresponding tensile force may be exerted (directly) on both the adjustable strap and the lap belts.

In order to exert this tensile force, belts or belt sections corresponding to the embodiment may pass through a (preferably triangular) eyelet which is connected or connectible to the belt tensioner.

In one embodiment, a (direct) tensile force may be applied to the adjustable strap (and so indirectly mainly to the shoulder straps), causing the corresponding belts to be tightened. Alternatively or additionally, a tensile force may be exerted on a seat anchorage, which has the effect of keeping the child safety seat close to the backrest (or shifting it closer to the backrest) of a motor vehicle seat (if the previously determined acceleration threshold value is exceeded).

In certain embodiments, the tensioner may (only) act on the seat anchorage; or on the seat anchorage and the adjustable strap and the lap belts; or on the seat anchorage and the lap belts. If a certain acceleration is detected, the respective elements are preferably pulled or pressed in the corresponding direction (relative to the other components of the child safety seat or a main body of the child safety seat).

The respective control device may be an electronic control device.

In general, the (respective) impact shield may be of dimensionally stable construction (if no external forces other than gravity act on it, which in particular does not preclude the impact shield from being deformable in the event of impact, by an airbag for example). A volume of the impact shields may be at least 1000 $cm^3$, preferably at least 2000 $cm^3$. A maximum extension of the impact shields relative to three mutually perpendicular axes may be at least 5 cm, preferably at least 10 cm (for each). The impact shield may comprise a cushioning arrangement.

The child safety seat preferably has a side impact protection structure. The side impact protection structure preferably comprises at least one (more preferably at least two, optionally at least one on each side of the child safety seat), preferably separately arranged (in particular arranged outwardly; preferably as a separate element from a seat body, which in particular has no child supporting function) and/or adjustable and/or laterally arranged side impact protection element(s). At least one side impact protection structure element may be arranged in a back portion. Alternatively or additionally, at least one side impact protection element may be arranged at the height of a head restraint. Alternatively or additionally, at least one side impact protection structure element may be arranged in a leg section. The (respective) side impact protection element is preferably dimensionally stable or rigid. The (respective) side impact protection element is preferably configured in such a way that it is able to take up a functioning position (with improved side impact protection) and a neutral position. In the functioning position, the (respective) side impact protection element preferably protrudes further outwards (to the side) than in the neutral position. An overall width of the child safety seat may be greater when the side impact protection element is in the functioning position than when it is in the neutral position. Switching between the functioning and the neutral positions may be accomplished translationally (by sliding, e.g., telescopically) and/or by pivoting (folding in or out, in particular into or out of an outer surface of the child safety seat).

The abovementioned object is also solved with a motor vehicle equipped with a child safety seat of the kind described.

The abovementioned object is also solved with a method for deploying an airbag of a child safety seat for attaching to a motor vehicle seat of the type described above, comprising a seat region, a back portion, an impact shield with integrated airbag, wherein an acceleration sensing device integrated in the child safety seat senses an acceleration of the child safety seat and a control causes a deployment of the airbag the basis of an acceleration detected by the acceleration sensing device.

The object described above is further solved with a method for activating an impact shield of a child safety seat for attaching to a motor vehicle seat of the type described above, comprising a seat region, a back portion and an impact shield having an integrated distance increasing device, in particular with integrated airbag, a first (upper or front) and a second (lower or rear) section, wherein the first section is connected to a main body of the child safety seat and the second section is connected to the first section, wherein distance increasing devices, in particular airbags, are activated in such a way that the second section is shifted towards that pelvis of a child sitting in the child safety seat, away from the first section, wherein the method preferably further comprises: sensing an acceleration of the child safety seat and triggering the distance increasing device, in particular the airbag, in response to the sensed acceleration.

The object described above is further solved with a method as described above for activating an impact shield and/or a belt system of a child safety seat for attaching to a motor vehicle seat, in particular of the type described above, comprising a seat region and a back portion, wherein the impact shield is positioned and/or wherein a belt system is placed under tension by a belt system belt tensioner, and/or wherein a child safety seat anchor is positioned, wherein an acceleration of the child safety seat is sensed and a positioning of the impact shield and/or a tensioning by means of the belt system belt tensioner when a predetermined acceleration and/or a positioning of the child safety seat anchor relative to the other components of the child safety seat is effected, particularly when an acceleration is sensed by an acceleration sensing device integrated in the child safety seat.

Preferred method features will become apparent from the description of the child safety seat, particularly from the functional features described therein.

Further variants of the invention are described in the subordinate claims.

In the following text, the invention will be described using exemplary embodiments thereof, which will be explained in greater detail with reference to the drawing. In the drawing.

In the following description, the same reference numbers are used for identical parts and parts with equivalent function.

Figure 1:
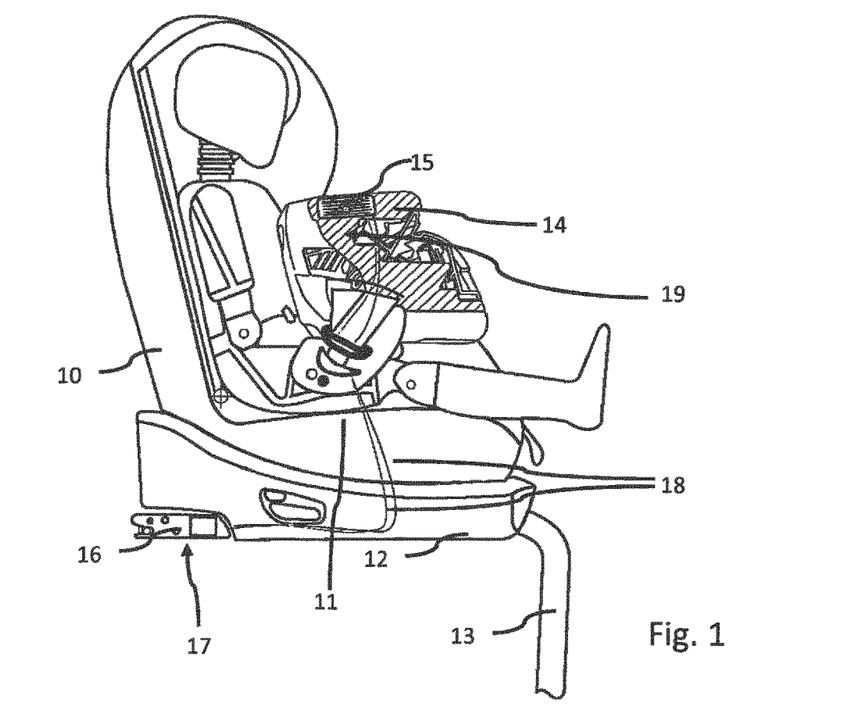
FIG. 1 shows a schematic side view (with partial cutaway) of a child safety seat according to the invention according to a first embodiment in a first state.

FIG. 1 shows a child safety seat with a backrest 10 and a seat region 11. The child safety seat further comprises a base 12 and a support leg 13 as optional elements.

An airbag 15 is provided in an impact shield 14 (in an upper section or adjoining an upper surface). In FIG. 1 the airbag 15 is in the non-activated state. An acceleration sensor 17 (not shown in detail) is arranged in a seat anchorage 16. The acceleration sensor 17 is connected to a control device 19 (not shown in detail) via cable 18, which control device triggers the airbag 15 (when a predetermined acceleration threshold value is exceeded).

Figure 2:
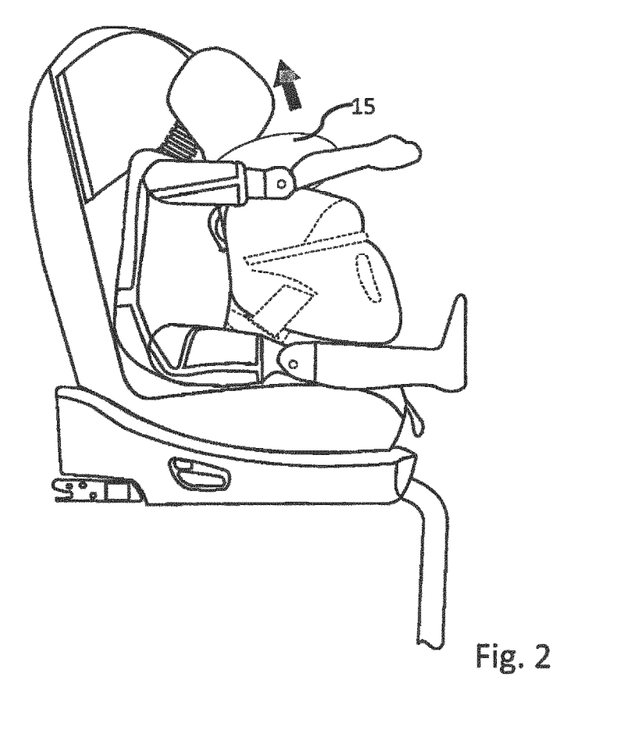
FIG. 2 shows the child safety seat of FIG. 1 in a second state.

The activated state is shown in FIG. 2. As may be discerned in that figure, the airbag is activated upwards and to the rear, so that (in the event of a frontal collision) the child's head and chest will be protected. Cables 18 are not shown in FIG. 2 for the sake of simplicity.

Figure 3:
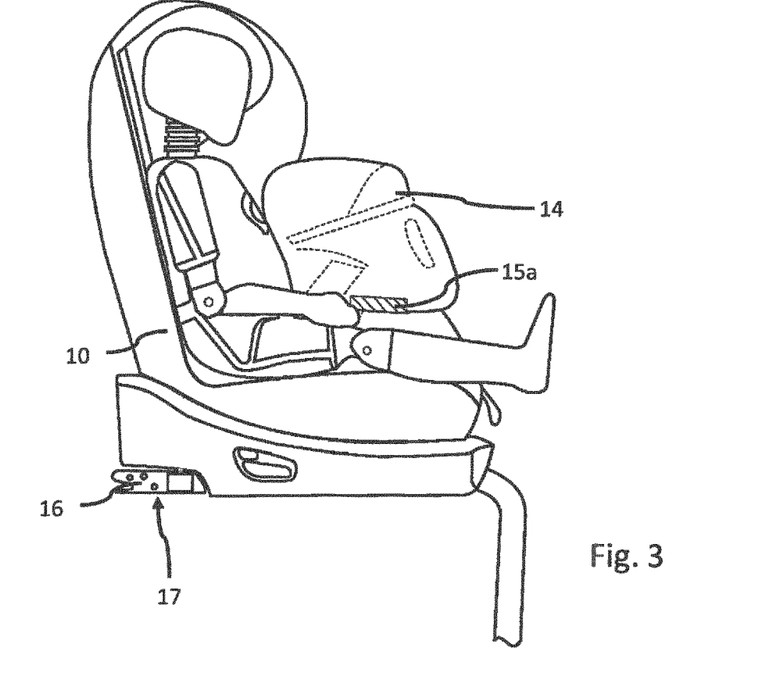
FIG. 3 shows a schematic side view (with partial cutaway) of a child safety seat according to the invention according to a second embodiment in a first state.
Figure 4:
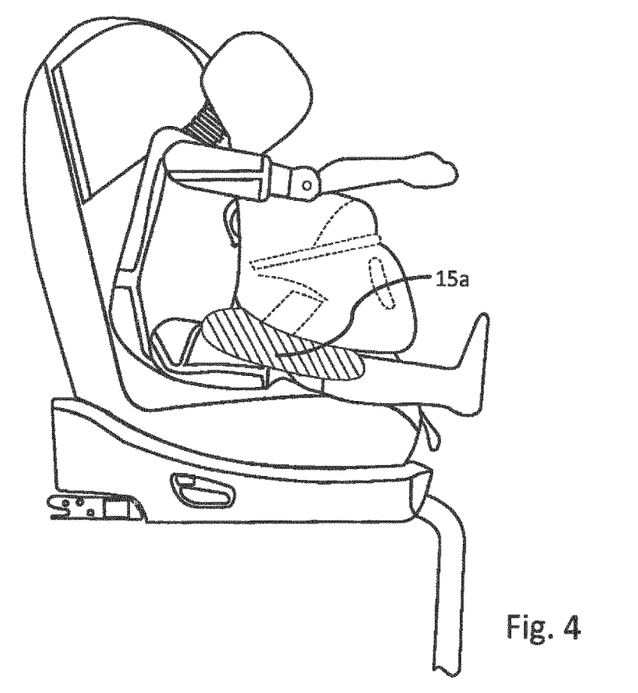
FIG. 4 shows the child safety seat of FIG. 3 in a second state.

The embodiment according to FIGS. 3 and 4 is basically the same as the embodiment of FIGS. 1 and 2. In this case, the airbag 15a is fitted on the bottom side, not the top side. The bottom-fitted airbag 15a is fitted in a lower section of the impact shield 14 and in particular borders a lower surface of the impact shield 14. When deployed (see FIG. 4), the airbag inflates towards the child's legs and pelvis/hips. This ensures in particular that the child is retained securely in place not only by friction or a squeezing action between the seat region and the impact shield, but also by a backward pressing action of the airbag (towards the child's pelvis), and "submarining" (slipping out under the impact shield) is effectively prevented.

Figure 5:
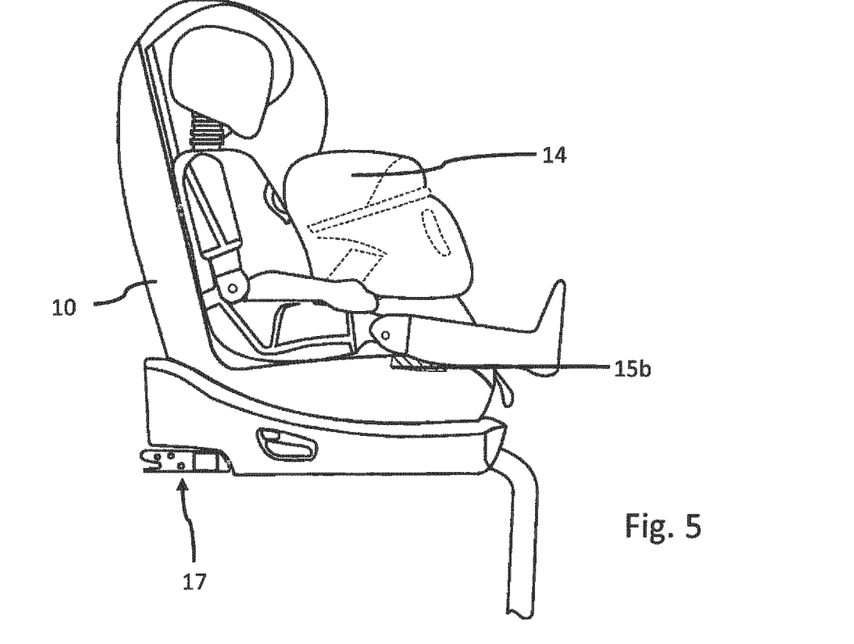
FIG. 5 shows a schematic side view (with partial cutaway) of a third embodiment of the child safety seat in a first state.
Figure 6:
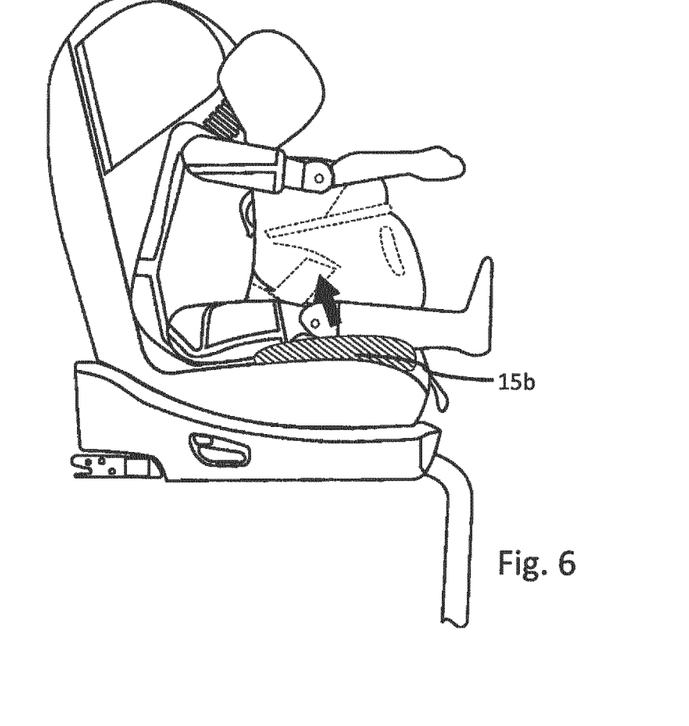
FIG. 6 shows the child safety seat of FIG. 5 in a second state.

The embodiment according to FIGS. 5 and 6 is also (substantially) the same as the embodiment of FIGS. 1 and 2, with the following differences. In this case, no airbag is fitted in the impact shield 14 (although an airbag similar to the one in FIGS. 1 and/or 3 may be provided). However, an airbag 15b is provided in the seat region 11 (and in the non-activated state at least, only inside a front half of the seat region 11). The airbag 15b adjoins an upper surface of the seat regions 11 an (in a front area). When deployed (see FIG. 6), the airbag presses or acts obliquely towards the rear. This has the effect of both preventing the child from sliding under the impact shield (or reducing the risk of this happening). Because of the rearward action, here too the child is restrained by corresponding counterpressure of the airbag, and not only by the squeezing action but also by a correspondingly acting counterpressure towards the rear. The control device (not shown in detail in FIGS. 5 and 6) for deploying the airbag may be arranged for example in the seat region 11 beside the airbag and (similarly to FIGS. 1 to 4) it may be connected to the acceleration sensor 17 by corresponding cables. In all cases, a wireless connection may also be created instead of a cable connection in all embodiments.

Figure 7:
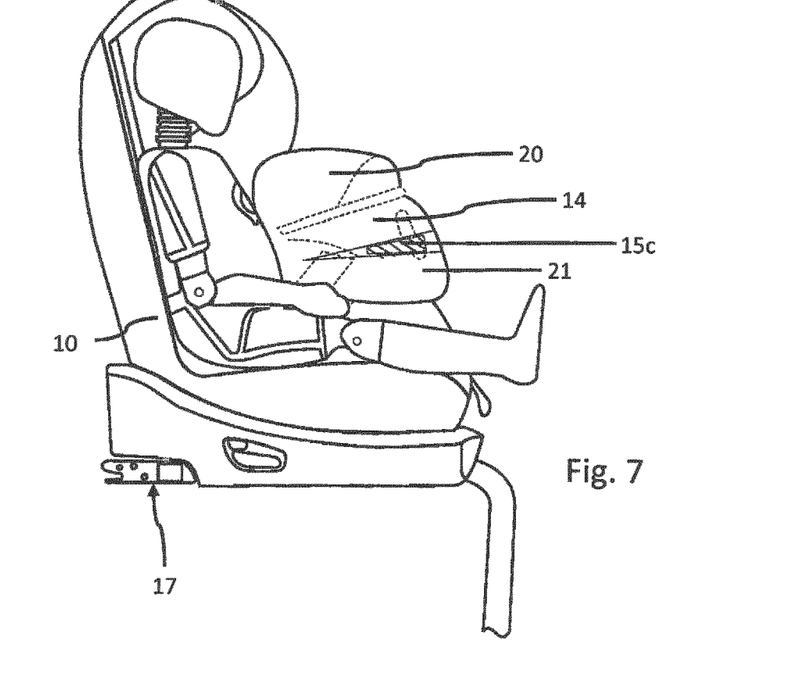
FIG. 7 shows a schematic side view (with partial cutaway) of a fourth embodiment of the child safety seat according to the invention in a first state.
Figure 8:
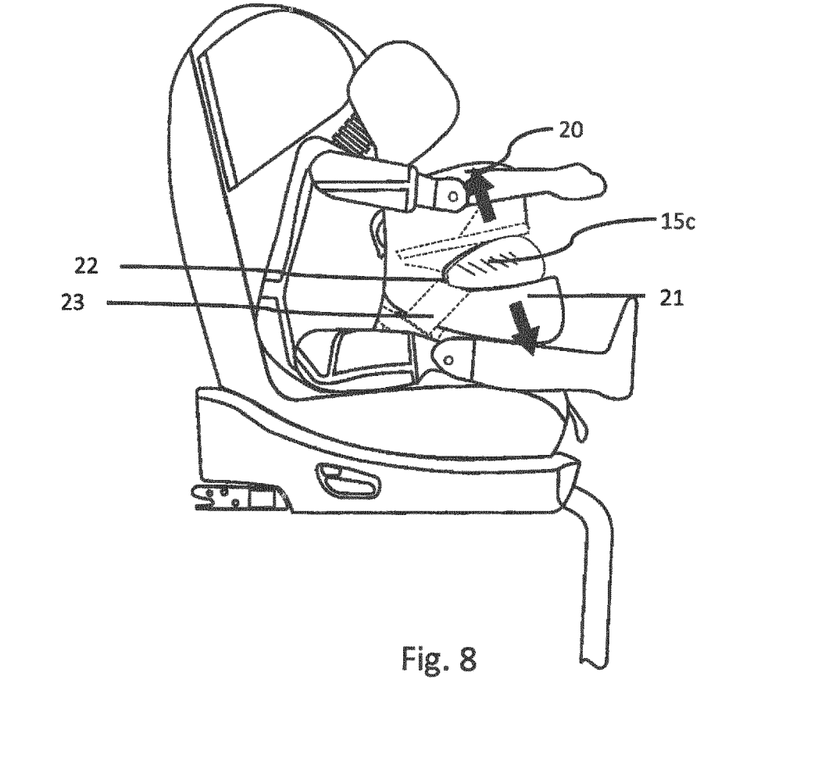
FIG. 8 shows the child safety seat of FIG. 7 in a second state.

The embodiment according to FIGS. 7 and 8 is substantially the same as the embodiment of FIGS. 1 and 2, with the following differences. In the embodiment of FIGS. 7 and 8, no airbag 15, 15a is provided in either the top or the bottom side (although they may be provided individually or in combination), instead an airbag 15c is arranged between a first Section 20 and a second Section 21. The first Section 20 is an upper section, the second section 21 is a lower section. The two sections 20, 21 may be opened out towards each other. If the airbag is activated (see FIG. 8) first section 20 and second section 21 are forced apart. As is also shown in FIG. 8, the side profile of the impact shield 14 is U-shaped (at least when it is deployed). The (deployed) airbag is arranged inside the leg of the U. Moreover, a belt guide 22 for a tether 23 may also be routed inside the U.

Figure 9:
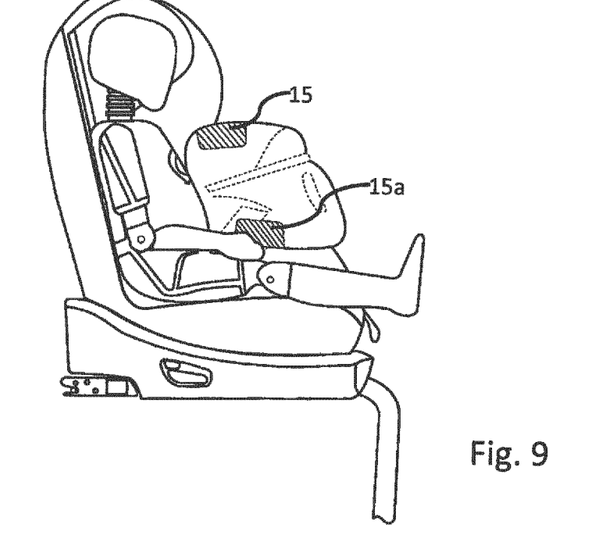
FIG. 9 shows a schematic side view (with partial cutaway) of a fifth embodiment of the child safety seat according to the invention in a first (non-activated) state.

FIG. 9 shows a further embodiment which corresponds to a combination of the embodiments according to FIGS. 1 and 3. Accordingly, in this embodiment both an upper side airbag 15 and a lower side airbag 15a are provided. Regarding the effects of airbags 15, 15a reference is made to the description of FIGS. 1 to 4.

Figure 10:
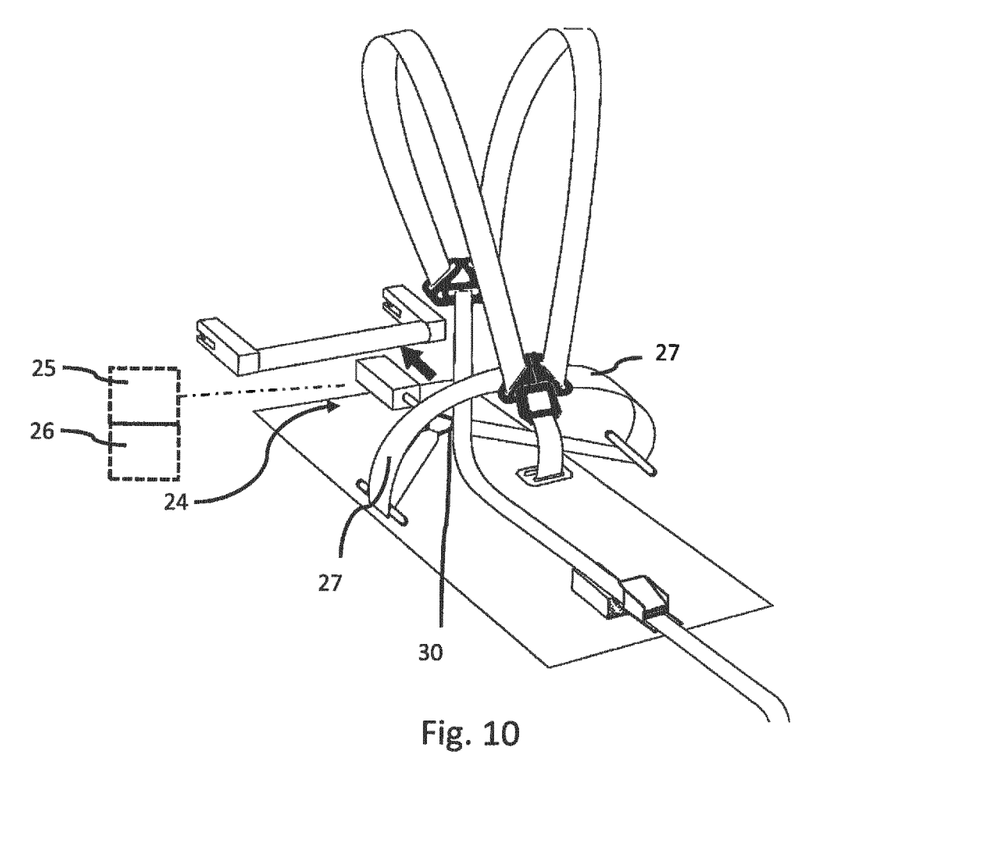
FIG. 10 is a schematic representation of a belt tensioner according to a first embodiment.

FIG. 10 is a perspective schematic view of a belt tensioner according to the invention. The belt tensioner 24 cooperates with a control device 25 (which may be provided additionally with regard to the aforementioned control device 19 or may be at least partly embodied thereby) and an acceleration sensing device and acceleration sensor 26 (which may be provided additionally with regard to the aforementioned acceleration sensing device and the aforementioned acceleration sensor or may be at least partly embodied thereby) in such a way that when a predetermined acceleration limit value is exceeded the controller 25 actuates the belt tensioner 24 so that it exerts a tensile force on lap belts 27.

The control device 25 and/or the acceleration sensing device and acceleration sensor 26 may be integrated in the belt tensioner or provided separately. The lap belts may be lower sections of combined lap-shoulder belts or they may be structurally separated (e.g., by an optionally rigid coupling element, which may include a tongue) from the shoulder belts.

As shown in FIG. 10 particularly the child's legs and pelvis may be held down (in the event of an accident, for example).

Figure 11:
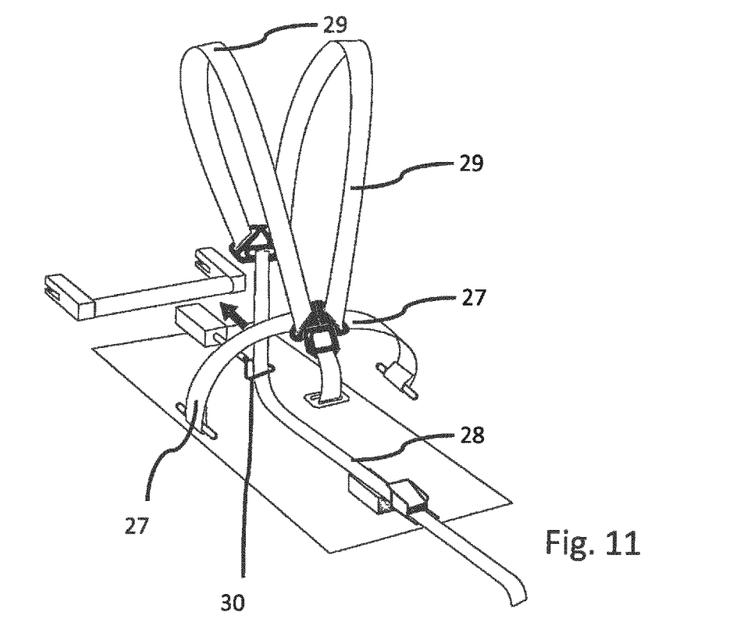
FIG. 11 is a schematic representation of a belt tensioner according to a second embodiment.

The embodiment of FIG. 11 is substantially the same as the embodiment according to FIG. 10, although in this case no (direct) tensile force is applied to the lap belts 27, but instead a tensile force is applied to an adjustable strap 28, so that shoulder straps 29 (mainly) are tightened (further) indirectly. The adjustable strap 28 is preferably an extension of the (particularly described earlier) shoulder straps 29 and is optionally connected therewith via a coupling element (e.g., having at least three or exactly three slots).

Figure 12:
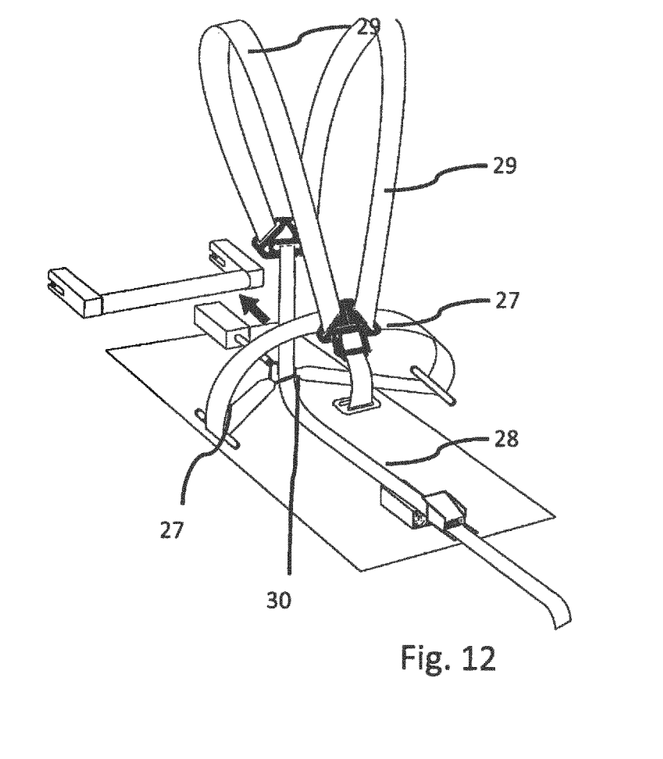
FIG. 12 is a schematic representation of a third embodiment or a belt tensioner.

The embodiment according to Fig. FIG. 12 is a combination of the embodiment of FIGS. 10 and 11, to the extent that a corresponding tensile force is exerted (directly) both on the adjustable strap 28 and on the lap belts 27.

To enable the tensile force to be applied, the corresponding belts or belt sections pass (in the embodiments according to FIGS. 10 to 13) through a (here preferably triangular) eyelet 29 which is connected or connectible to the belt tensioner 24.

Figure 13:
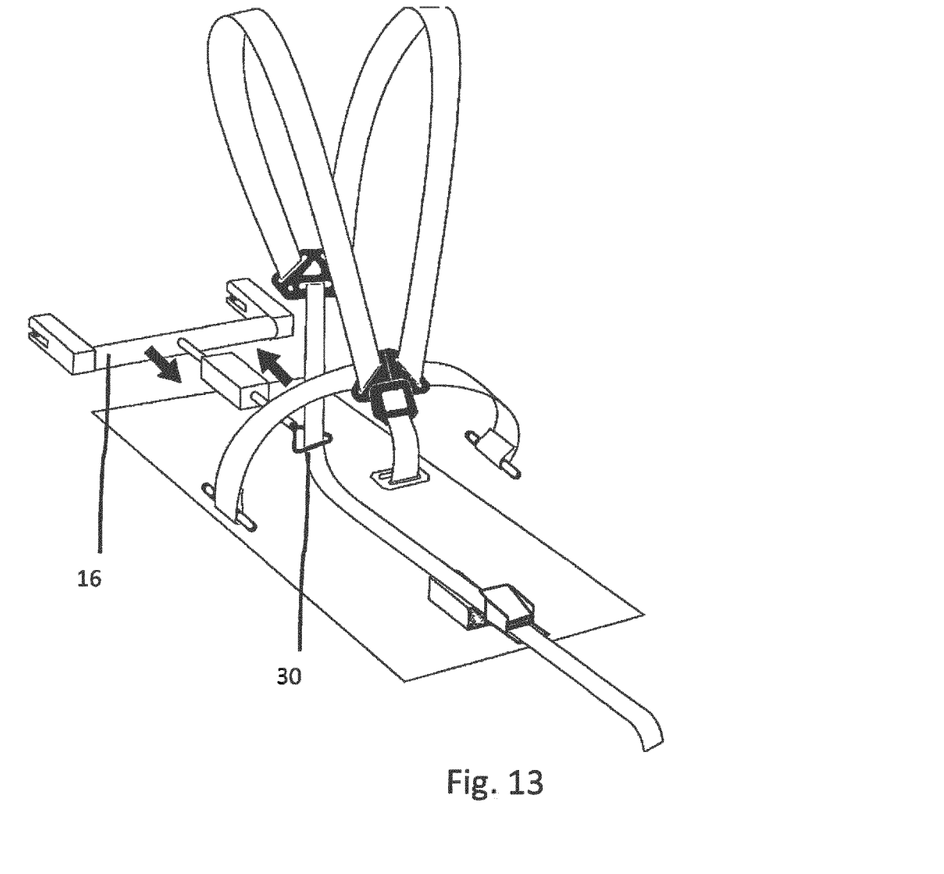
FIG. 13 shows a fourth embodiment of a belt tensioner according to the invention.

FIG. 13 shows a solution in which a (direct) tensile force is also (as in FIG. 11) applied to adjustable strap 28 (and thus indirectly mainly to the shoulder straps 29), with the effect that the corresponding belts are tightened. A tensile force is also exerted on a seat anchorage 16, which has the effect of holding the child safety seat close against the backrest of a motor vehicle seats (or pressing it closer to the backrest) (if the predetermined acceleration threshold value is exceeded).

Alternatively, it is possible for the tensioner to only act on the seat anchorage 16; or on the seat anchorage 16 and the adjustable strap and the lap belts 27; or on the seat anchorage 16 and the lap belts 27. If a certain acceleration is detected, the respective elements are pulled (or pushed) (relative to the other components of the child safety seat or a main body of the child safety seat), in the direction of the arrows shown in FIGS. 10 to 13.

The respective control device may be an electronic control device.

At this point it should be noted that all of the parts described in the preceding text, in particular the details represented in the drawings, are claimed as essential to the invention both individually and in any combination. Variations thereof will be familiar to those skilled in the art.

LIST OF REFERENCE SIGNS

10 Backrest
11 Seat region
12 Base
13 Support leg
14 Impact shield
15 Airbag
15a Airbag
15b Airbag
15c Airbag
16 Seat anchorage
17 Acceleration sensor
18 Cable
19 Control device
20 First section
21 Second section
22 Belt guide
23 Tether
24 Belt tensioner
25 Control device
26 Acceleration sensor 27 Lap belt
28 Adjustable strap
29 Shoulder strap
30 Eyelet

The invention claimed is:

1. A child safety seat for attaching to a motor vehicle seat, comprising:
    a seat region,
    a back portion,
    an impact shield, wherein at least one of the impact shield and the seat region includes an integrated airbag,
    an acceleration sensing device for sensing an acceleration of the child safety seat, and
    a control device which is configured in such a way that at least one of the integrated airbag of the impact shield or the integrated airbag of the seat region is deployed on the basis of the acceleration sensed by the acceleration sensing device.

2. The child safety seat for attaching to a motor vehicle seat according to claim 1, wherein the impact shield includes an integrated distance increasing device, a first section, and a second section, wherein the second section is connected to the first section and is configured such that in the event of an activation of the distance increasing device, the second section is shifted towards a pelvis or a leg of a child sitting in the child safety seat, away from the first section, and wherein the impact shield is configured to be retained or fastened to the child safety seat in a region of the first section,
    and wherein the distance increasing device is triggered on the basis of the acceleration sensed by the acceleration sensing device.

3. The child safety seat for attaching to a motor vehicle seat according to claim 1, further comprising
    an impact shield positioning apparatus configured for positioning the impact shield,
    a belt system having a belt system belt tensioner, wherein the belt system is configured to be tightened by the belt system belt tensioner,
    a child safety seat anchor positioning apparatus and
    wherein the acceleration sensing device is configured such that
    positioning of the impact shield is effected by the impact shield positioning apparatus,
    a tensioning is effected by the belt system belt tensioner, and
    a positioning of the child safety seat anchor relative to the other components of the child safety seat is effected in response to the acceleration sensed by the acceleration sensing device.

4. The child safety seat according to claim 1, wherein the acceleration sensing device comprises an acceleration sensor.

5. The child safety seat according to claim 1, wherein the control device actuates or activates on an acceleration threshold value of at least 2 g.

6. The child safety seat according to claim 1, wherein in the event of activation, at least one of the integrated airbags is forced towards a hip or a leg of a child sitting in the child safety seat.

7. The child safety seat according to claim 1, wherein the acceleration sensing device is arranged on a section of the child safety seat which is located close to a vehicle or a vehicle body when the child safety seat is fitted.

8. The child safety seat according to claim 1, wherein the control device and the acceleration sensing device are connected to each other by cables or wirelessly.

9. The child safety seat according to claim 1, wherein the impact shield is retained on the child safety seat by a vehicle belt system or by an additional retaining device integrated in the child safety seat by a tether, wherein a cable is provided in the additional retaining device for transmitting information from the acceleration sensing device to the control device.

10. The child safety seat according to claim 1, wherein a force limiter is provided for limiting a force exerted on the child by a restraining belt, wherein a threshold value of the force limiter is greater than a threshold value of a positioning device of a belt system belt tensioner.

11. The child safety seat according to claim 1, wherein a side impact protection structure comprising at least one separately arranged and adjustable and laterally disposed side impact protection elements.

12. A motor vehicle with a child safety seat according to claim 1.

13. The child safety seat according to claim 1, wherein the impact shield includes an integrated airbag which, in the event of activation, is forced one or both of downwards and to a rear.

* * * * *